United States Patent [19]

Poteet

[11] Patent Number: 5,761,968
[45] Date of Patent: Jun. 9, 1998

[54] STEERING WHEEL OVERLAY

[75] Inventor: Tom A. Poteet, Valencia, Calif.

[73] Assignee: Grant Products, Glendale, Calif.

[21] Appl. No.: 902,062

[22] Filed: Jul. 29, 1997

Related U.S. Application Data

[63] Continuation of Ser. No. 621,861, Mar. 25, 1996, abandoned.

[51] Int. Cl.⁶ .............................. B62D 1/04; B62D 1/06; G05G 1/10
[52] U.S. Cl. .............................. 74/558; 74/552
[58] Field of Search .............. 74/552, 558, 558.5; 280/750, 751

[56]  References Cited

U.S. PATENT DOCUMENTS

| D. 97,231 | 10/1935 | Jackson. | |
|---|---|---|---|
| 1,446,628 | 2/1923 | Ridge. | |
| 1,472,689 | 10/1923 | Skiles. | |
| 2,197,409 | 4/1940 | Jackson. | |
| 3,319,486 | 5/1967 | Spencer. | |
| 3,945,416 | 3/1976 | Rim | 74/558 X |
| 4,441,382 | 4/1984 | Snooks. | |
| 4,581,954 | 4/1986 | Uchida | 74/552 |
| 4,782,872 | 11/1988 | Moschini | 74/558 |
| 4,788,759 | 12/1988 | Yano et al. | 74/558 |
| 4,920,822 | 5/1990 | Abiko | 74/552 |
| 4,976,801 | 12/1990 | Martine et al. | 74/552 |
| 5,060,535 | 10/1991 | Fujita. | |
| 5,070,742 | 12/1991 | Sakane et al. | 74/558 |
| 5,188,000 | 2/1993 | Kaga | 74/552 |
| 5,205,186 | 4/1993 | Draxlmaier | 74/558 |
| 5,207,713 | 5/1993 | Park. | |
| 5,287,767 | 2/1994 | Engelstein. | |
| 5,294,775 | 3/1994 | Carrier | 74/558 |
| 5,305,655 | 4/1994 | Kaga | 74/552 |
| 5,327,799 | 7/1994 | Lin. | |
| 5,343,776 | 9/1994 | Falco et al.. | |

FOREIGN PATENT DOCUMENTS

| 4-55164 | 2/1992 | Japan | 74/558 |
|---|---|---|---|
| 4-154481 | 5/1992 | Japan | 74/558 |
| 4-159174 | 6/1992 | Japan | 74/558 |
| 4-163277 | 6/1992 | Japan | 74/558 |
| 5-42875 | 2/1993 | Japan | 74/558 |
| 1091765 | 11/1967 | United Kingdom | 74/558 |
| 1398685 | 6/1975 | United Kingdom | 74/552 |

*Primary Examiner*—Vinh T. Luong
*Attorney, Agent, or Firm*—Loeb & Loeb LLP

[57]  ABSTRACT

A steering wheel "after-market" overlay, having a unitary, integral, relatively stiff, thin-walled construction, is adapted to be adhesively applied to and closely conform to the surface of the upper portion of an original equipment steering wheel. The overlay covers not only the upper portion of the steering wheel grip but also the upper portions of the steering wheel spokes up to the center pad of the steering wheel. The portion of the overlay covering each spoke has an radially inner terminus including a flange that is adapted to extend into the small space that typically exists between the inner end surface of the spoke and the side peripheral surface of the center pad. By also covering the upper portions of the spokes, not only is the appearance of the overlaid steering wheel enhanced, but the bonded surface area is substantially increased thereby assuring the long term positional stability and peel resistance of the overlay.

14 Claims, 8 Drawing Sheets

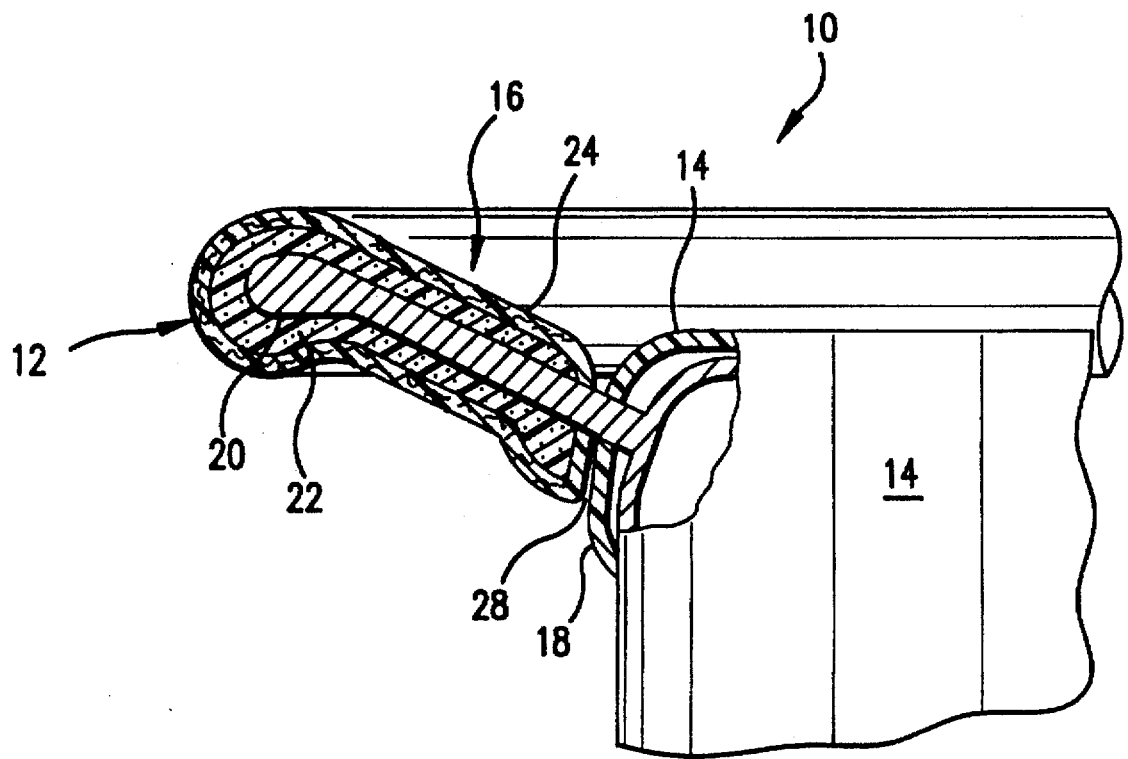
FIG. 2
(PRIOR ART)
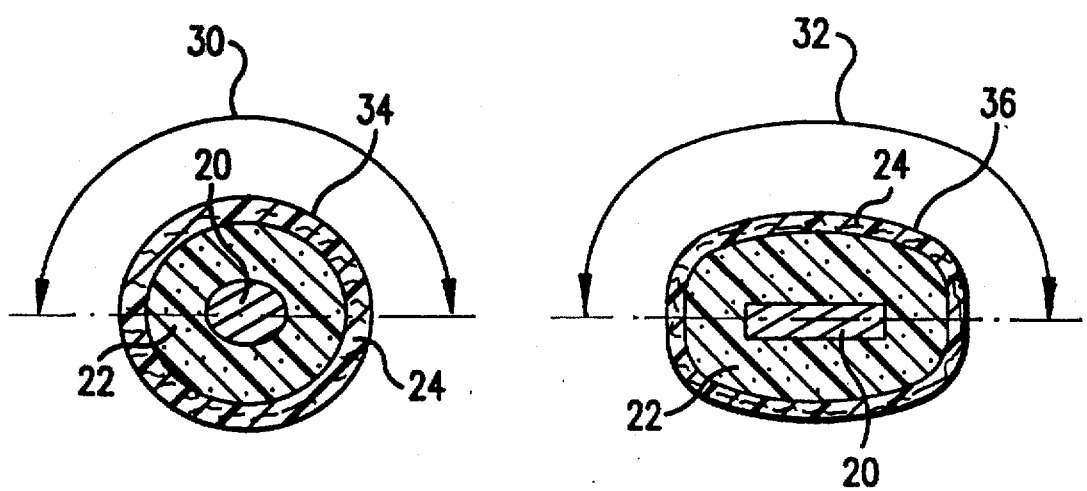
FIG. 3
(PRIOR ART)
FIG. 4
(PRIOR ART)

STEERING WHEEL OVERLAY

This is a continuation of application Ser. No. 08/621,861 filed on Mar. 25, 1996, now abandoned.

FIELD OF THE INVENTION

The present invention relates generally to covers for automobile and truck steering wheels, and more particularly to an overlay for covering the upper portions of both the grip and the spokes of a steering wheel.

BACKGROUND OF THE INVENTION

Various kinds of steering wheel covers are available for improving the appearance, grip and comfort of existing or original equipment steering wheels. These "after-market" steering wheel covers are typically sold through retail supply outlets and do not require any particular expertise to install and therefore can be installed by the vehicle owner. Such covers provide a relatively simple and inexpensive way to improve the steering wheel without having to remove and replace it with a custom wheel. In fact, with the advent of complex airbag safety systems in which the airbag is enclosed within a housing or module under the center pad of the steering wheel, the removal of the steering wheel by unqualified persons is discouraged by original equipment automobile and truck manufacturers. Leather or vinyl steering wheel straps wrapped around the rim or grip of the steering wheel are well known. These after-market steering wheel enhancements, however, do not provide sufficient versatility as to surface textures and they also do not conform closely enough to the surface of the steering wheel grip. Moreover, they cover the finger indentations on the back surface of the steering wheel grip.

Attempts have been made to provide adhesively bonded steering wheel covers that do not cover the finger indentations on the back of the steering wheel grip but these are not altogether satisfactory. Some of these prior art covers tend to be thick and because they do not conform closely enough to the grip and do not cover the spokes, the edges of the cover are plainly visible thus detracting from the appearance of the steering wheel. Further, because these partial steering wheel covers only cover a portion of the grip and because the area of the bonded surface is limited, these covers tend to peel off, and particularly so when subjected to the twisting forces often applied to the steering wheel grip by the driver.

SUMMARY OF THE INVENTION

The present invention provides a simple, inexpensive and easily installable overlay for improving the appearance, comfort and grip of a steering wheel assembly without having to remove the assembly. The overlay of the present invention does not affect the finger indentations on the rear surface of the existing steering wheel grip yet is not subject to peeling or displacement relative to the wheel.

In accordance with the present invention, there is provided a steering wheel "after-market" overlay that has a unitary, integral, relatively stiff, thin-walled construction. The overlay is adapted to be adhesively applied to and closely conform to the original equipment steering wheel and covers not only the upper portion of the steering wheel rim or grip but also the upper portions of the spokes up to the center pad of the steering wheel. The portion of the overlay covering each spoke terminates in a flange that is extendible into the small space that typically exists between the inner end surface of the spoke and the side peripheral surface of the center pad. By also covering the upper portions of the spokes, not only is the appearance of the overlaid steering wheel enhanced, but the bonded surface area is also substantially increased thereby assuring the long term positional stability and peel resistance of the overlay. Furthermore, by capturing the flanges at the junctions of the spokes and center pad, the overlay is accurately located and anchored securely so as to prevent it from shifting relative to the steering wheel.

The overlay of the present invention may be made of many different materials and can provide a range of textures and surface treatments. For example, without limitation, the overlay can be formed of acrylic plastic, carbon fiber or fiberglass and can be made to simulate wood, leather or vinyl. The overlay can be covered with various materials such as leather or vinyl. Moreover, the overlay of the invention may be applied to the steering wheels of new or used vehicles and although particularly useful with airbag equipped steering wheels, the overlay may be used with any kind of steering wheel. In addition, ergonomic enhancements can be added to the inner and/or outer surfaces of the overlay as integral parts of the unitary overlay. Such enhancements might include indentations for thumb grips and heel pads for supporting the operator's palms.

BRIEF DESCRIPTION OF THE DRAWINGS

Further objects, advantages and features of the present invention will become apparent from the detailed description, below, when read in conjunction with the accompanying drawings in which:

FIGS. 2, 3 and 4 are section views taken along the lines 2—2, 3—3 and 4—4, respectively, in FIG. 1;

DETAILED DESCRIPTION OF THE PREFERRED EMBODIMENT

Figure 1:
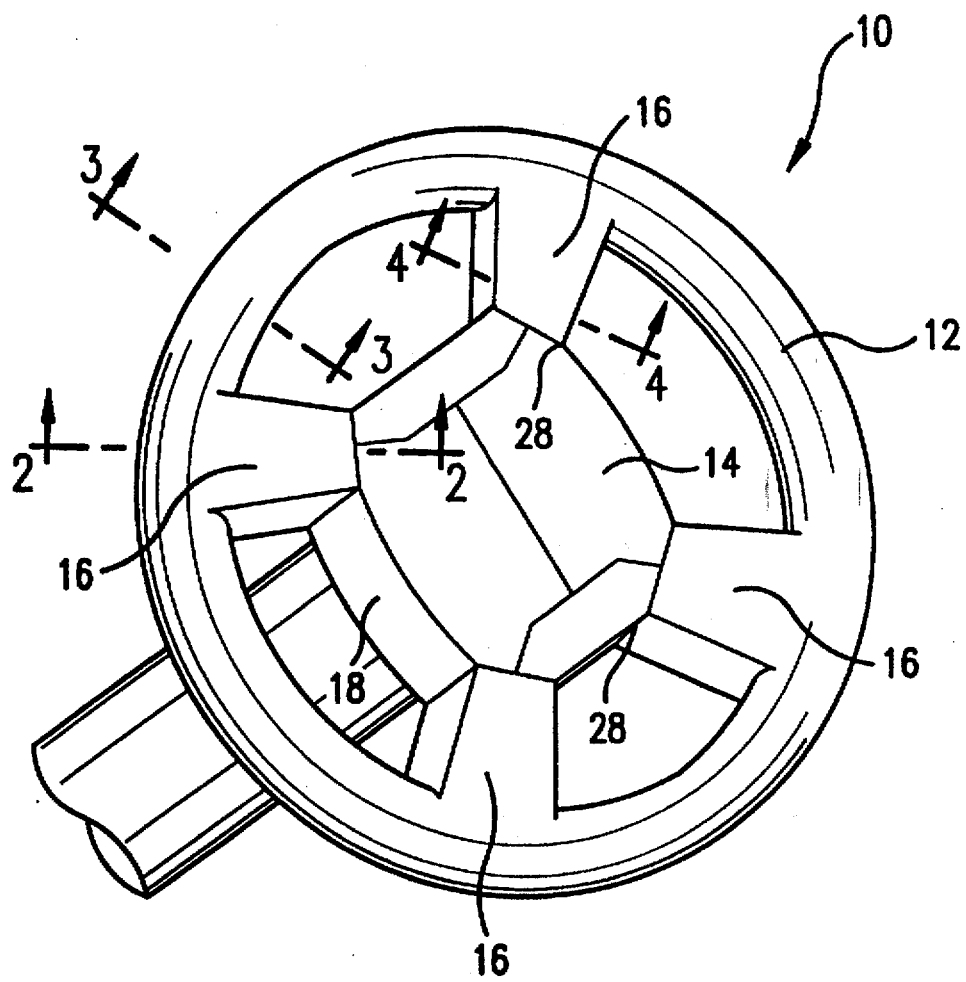
FIG. 1 is a perspective view of an original equipment steering wheel assembly showing the main features thereof.
Figure 5:
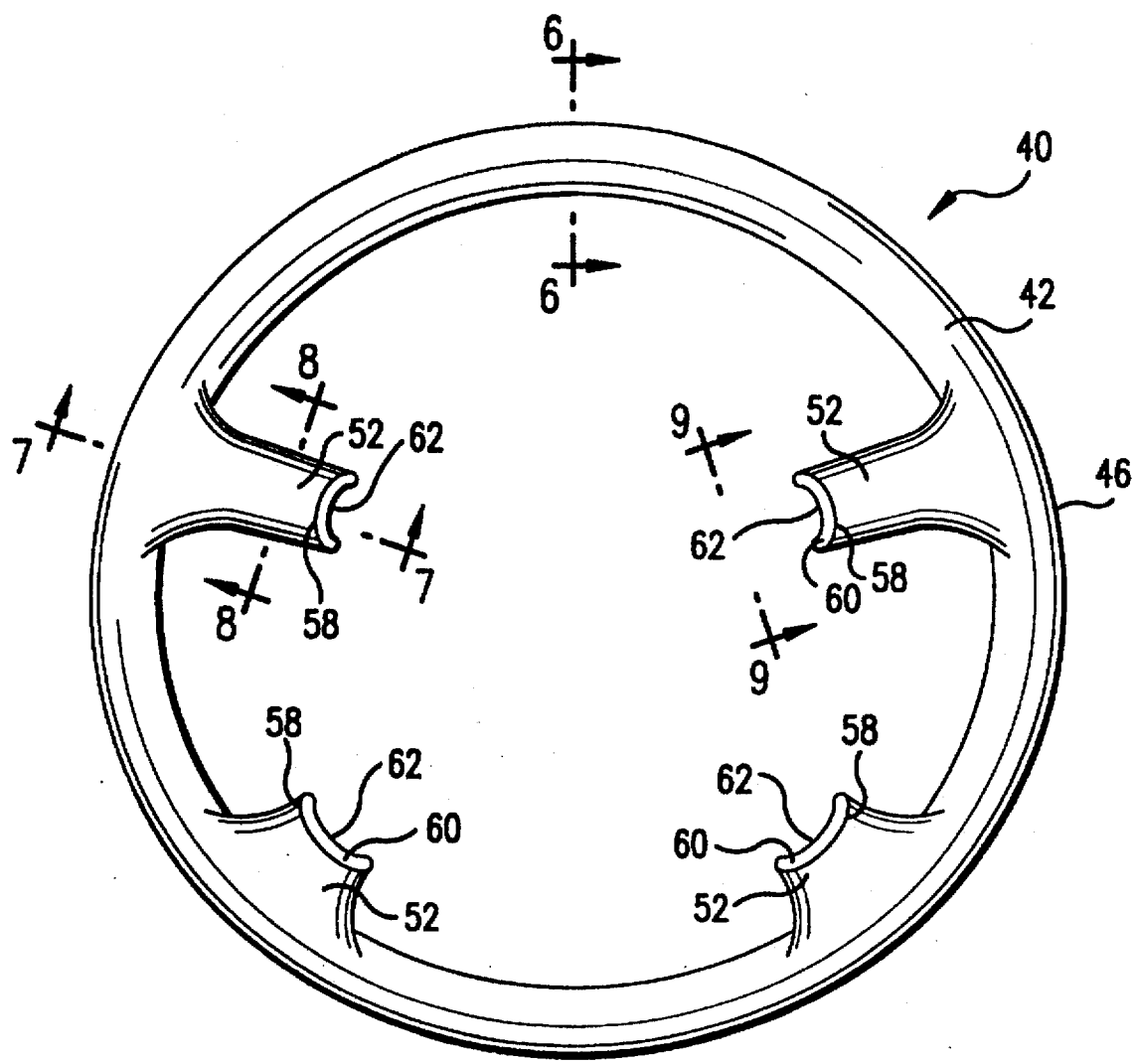
FIG. 5 is a plan view of an overlay in accordance with the present invention.

FIGS. 1–4 show a typical original equipment steering wheel assembly 10 to which the overlay of the present invention may be applied. As is well known, the steering wheel assembly 10 includes a circumferential ring-like rim or grip 12, a center pad 14 and a plurality of generally radially inwardly extending spokes 16 connecting the grip 12 and the peripheral side surface 18 of the center pad 14. In the example shown, the steering wheel assembly 10 has four spokes 16 although it will be understood that the number of spokes will depend upon the particular steering wheel assembly design.

As best seen in FIGS. 2–4, the grip and spokes of the steering wheel assembly 10 are constructed around a metallic core 20 (details of which are well-known in the art). The core 20 may be encased within foam or like resilient material 22 in turn covered by a flexible cover material 24 such as leather or vinyl. The center pad 14 typically comprises a molded PVC or polyurethane part having a surface textured to match that of the material 24 covering the grip and spokes.

In most of today's steering wheel assemblies, the inner edge margin of the material 24 covering each spoke 16 is tucked into a gap or space 28 at the junction of the spoke and the center pad periphery 18 and adhesively bonded in place. The cover material 24 may be in abutment with or spaced apart by a small gap from the center pad periphery 18 at the junction of the spokes 16 and center pad periphery.

As shown in FIGS. 3 and 4, the grip 12 and spokes 16 include upper portions 30 and 32, respectively, defined by the arcuate arrows in those Figures; these portions face the operator of the vehicle. The upper portions 30 and 32 include exterior surfaces 34 and 36, respectively.

The center pad 14 may house a supplemental restraint system in the form of an airbag module although it will be understood that the present invention is equally applicable to steering wheel assemblies having conventional center pads or hubs. The present invention, however, has particular utility for steering wheel assemblies having airbag modules because the removal of such steering wheel assemblies for replacement with a custom steering wheel is discouraged for obvious safety reasons. In the example shown, the steering wheel assembly is dished, that is, the center pad 14 is below the plane of the ring-like grip 12. Again, it will become evident that the invention applies equally to non-dished steering wheel assemblies.

FIGS. 5–9 show details of a first embodiment of a shell-like steering wheel overlay in accordance with the invention. The overlay 40 of FIGS. 5–9 is a unitary, integral, relatively stiff, thin-walled structure which, when made of plastic, may be readily molded or vacuum formed as a single piece by well-known fabrication techniques. By "relatively" stiff is meant that the overlay 40 has a limited amount of flexibility to permit the overlay to be pressed into conformity with the receiving surfaces 34 and 36 of the steering wheel assembly, as will be described below. By way of example, the overlay is preferably made of an acrylic plastic, carbon fiber or fiberglass or the like, but may also be made of wood, metal, rubber or the like. In accordance with one practical form of the invention, the overlay 40 is made of an acrylic plastic about 0.060 inch thick. The overlay 40 has an exterior surface 42 and an interior surface 44. The exterior surface 42 may be provided with various textures, patterns, colors or other finishes; a design may be embedded within the material itself or, where clear acrylic plastic is used for the overlay material, simulated wood, carbon fiber or other patterns can be screen printed on, or otherwise applied to, the interior surface 44. The exterior surface 42 can be treated likewise or covered with various grip and appearance enhancing materials such as leather or vinyl.

Figure 6:
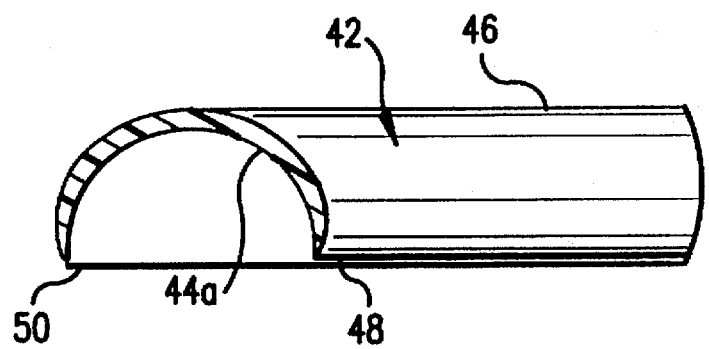
FIGS. 6, 7 and 8 are section views of the overlay of FIG. 5 as seen along the lines 6—6, 7—7 and 8—8.
Figure 7:
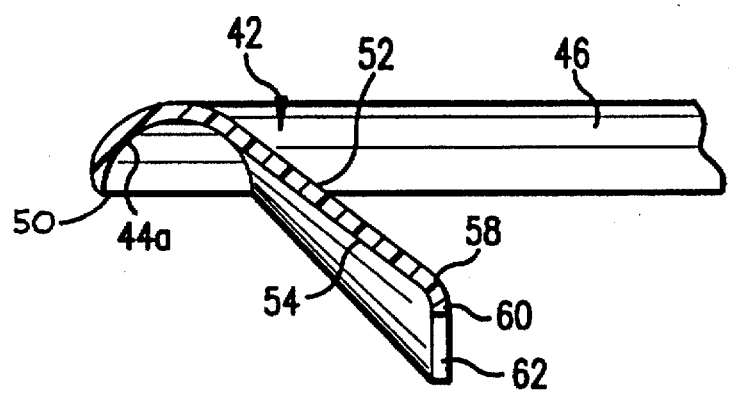
Figure 8:
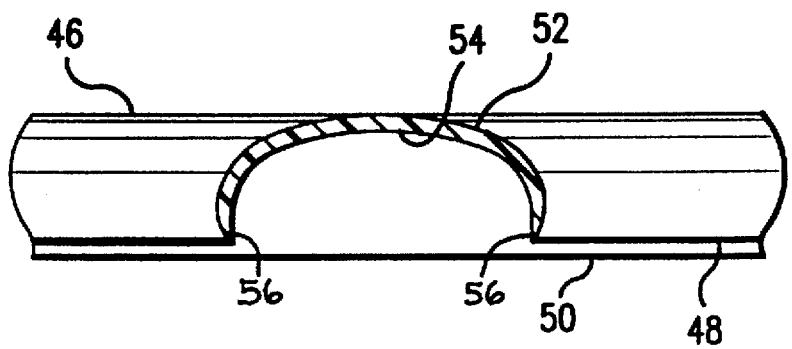
Figure 9:
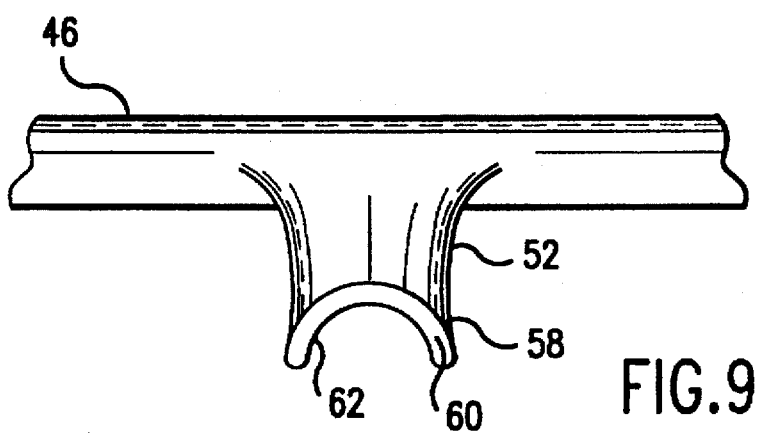
FIG. 9 is a view of a portion of the overlay of FIG. 5 as seen along the line 9—9 in FIG. 5.
Figure 10:
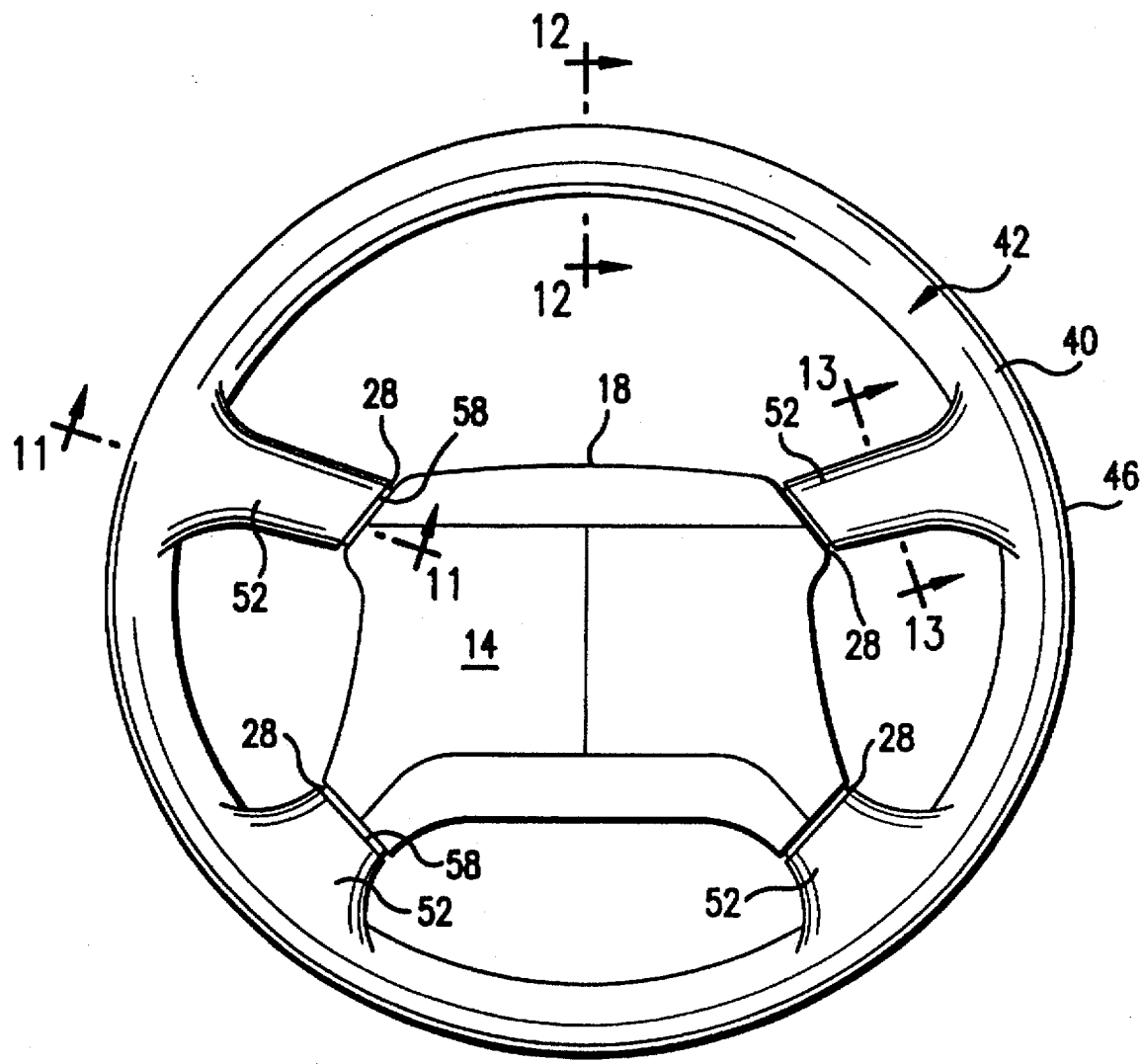
FIG. 10 is a plan view of a steering wheel assembly including an overlay in accordance with the present invention.
Figure 11:
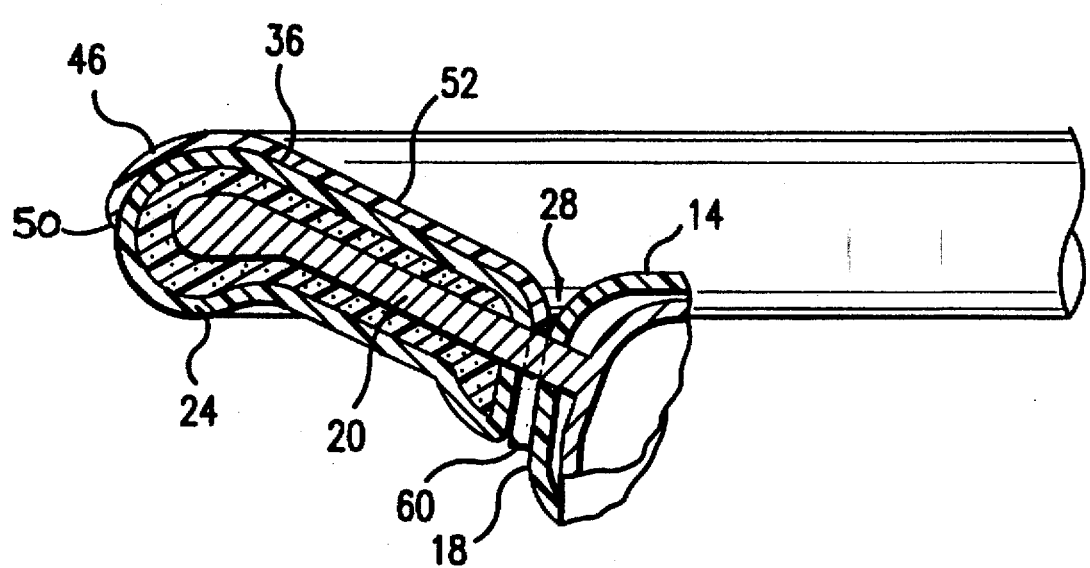
FIGS. 11, 12 and 13 are section views of the assembly of FIG. 10 as seen along the lines 11—11, 12—12 and 13—13 in FIG. 10.
Figure 12:
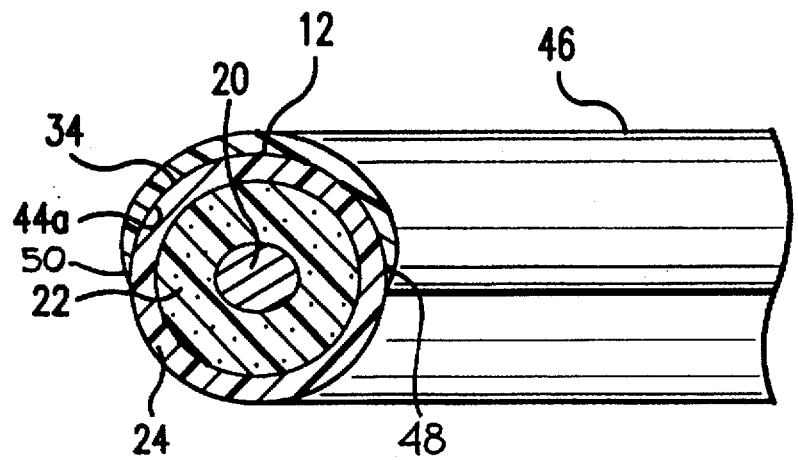
Figure 13:
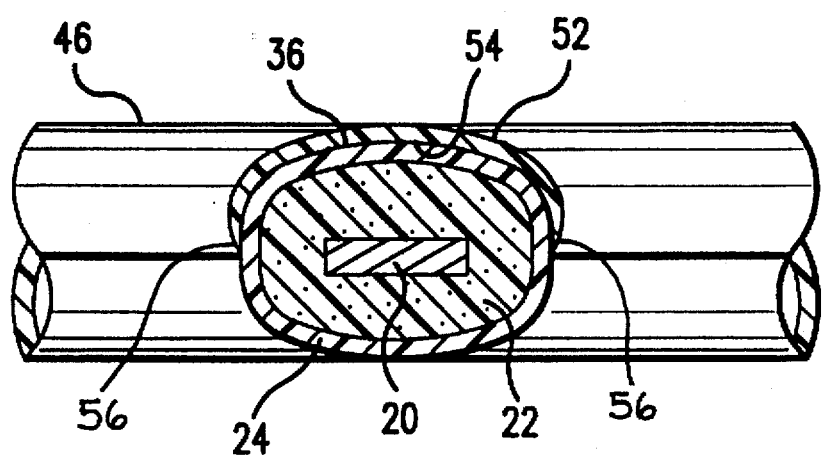

The overlay 40 includes a circumferential, ring-like part 46 having an arcuate or curved cross section (FIG. 6) so that the interior surface 44a of the ring-like part will substantially conform to the shape of the exterior surface 34 of the upper portion 30 of the steering wheel assembly grip 12. The part 46 includes inner and outer edges 48 and 50, respectively, that are preferably feathered, that is, tapered (as best seen in FIG. 6) so that the edges are not only visually inconspicuous but do not effect the comfort of the grip.

The overlay 40 further includes a plurality of spoke parts 52 extending generally radially inwardly and corresponding in placement and shape to the spokes 16. The spoke parts 52 will each typically have an arcuate or curved cross section which, by way of example, may have a semicircular or flattened, inverted U-shaped configuration (FIG. 8), depending upon the configuration of the underlying spoke to which the overlay closely conforms. The spoke parts 52 each include an interior wall 54 that is continuous with the interior surface 44a of the ring-like part 46 and conforms to the shape of the exterior surface 36 of the upper portion 32 of the corresponding spokes 16. The spoke parts 52 have lower edges 56 which, like the lower edges of the ring-like section, may be feathered (FIG. 8) so as to enhance the appearance of the overlaid steering wheel assembly without detracting from its comfort. Each spoke part 52 has an inner terminus 58 provided with a generally downwardly extending flange 60 having a central cutout 62 for clearing the core of the steering wheel assembly.

The installed overlay is shown in FIGS. 10–13.

The exterior surfaces 34 and 36 of the steering wheel assembly grip and spokes which are to receive the overlay 40 are cleaned with an appropriate solvent and the overlay is adhesively applied to the steering wheel. For this purpose, the interior surface 44 of the overlay is preferably provided with adhesive tape from which a protective film is peeled before applying the overlay to the steering wheel. Alternatively, the interior surface of the overlay may be coated with an adhesive bonding agent furnished with the overlay. In applying the overlay to the steering wheel, the flanges 60 are pressed into place between the cover material 24 and the center pad periphery 18 at the junctions of the spokes 16 and center pad 14. The flanges not only eliminate any unsightly, abrupt edges but serve to locate, anchor and stabilize the overlay to prevent shifting thereof relative to the steering wheel. The combined grip and spoke surface area that is bonded to the steering wheel is large enough to insure that the overlay will be held in place and will not peel off the steering wheel.

Figure 14:
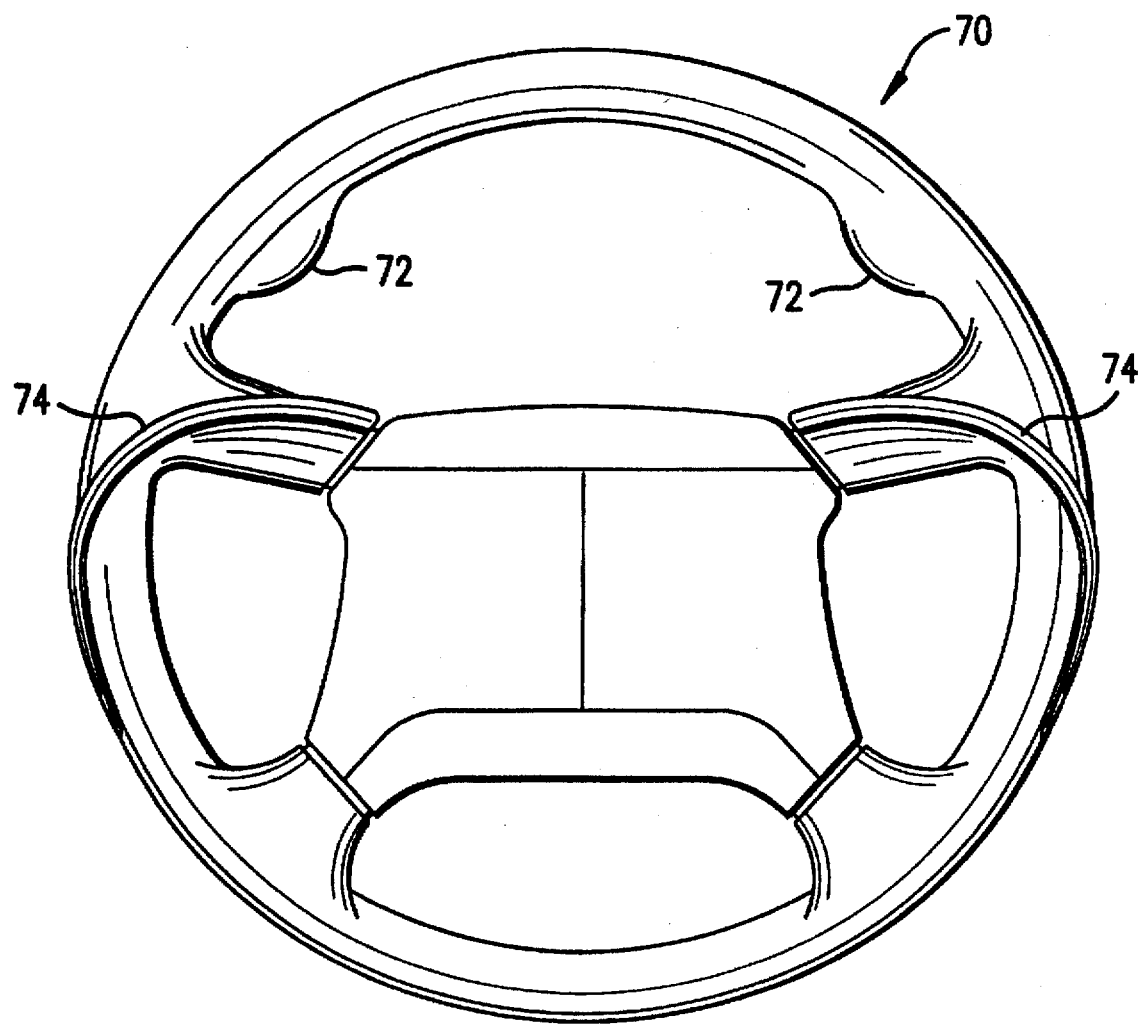
FIG. 14 is a plan view of a steering wheel having an overlay in accordance with an alternative embodiment of the invention including integrally formed ergonomic enhancements or anatomical grips.

FIG. 14 shows an alternative embodiment of the overlay of the present invention. In the alternative embodiment of FIG. 14, the overlay 70 is provided with ergonomic enhancements formed integrally with the overlay. In the example shown in FIG. 14, the ergonomic enhancements may include, by way of example, thumb grips 72 and raised heel pads 74 for supporting the operator's palms.

While preferred embodiments of the present invention have been disclosed herein, it will be obvious that they may be varied in many ways. Such variations are not to be regarded as a departure from the spirit and scope of the invention, and all such modifications as would be obvious to those skilled in the art are intended to be included within the scope of the claims that follow.

I claim:

1. An overlay kit for covering a steering wheel assembly in a vehicle, the steering wheel assembly having a circumferential, ring-shaped grip, a center pad having a peripheral surface, and a plurality of generally radially inwardly extending spokes connecting the circumferential grip and the center pad, the grip and spokes having upper portions which face a driver of the vehicle, the overlay kit being shaped to cover the upper portions of the grip and spokes of the steering wheel assembly, and the overlay kit comprising:

a circumferential, ring-shaped part having a U-shaped cross section substantially conforming only to the cross section of the upper portion of the grip, the ring-shaped part of the overlay having an interior surface adapted to substantially fully engage and be adhesively bonded to the upper portion of the grip; and a plurality of spoke parts corresponding to the spokes of the steering wheel assembly, the spoke parts extending generally radially inwardly from the ring-shaped part, each spoke part having a U-shaped cross section shaped to substantially conform only to the cross section of the upper portion of the corresponding spoke and having an interior surface continuous with the interior surface of the ring-shaped part and adapted to substantially fully engage and be adhesively bonded to the upper portion of the spoke.

2. The overlay kit as defined in claim 1 wherein the spokes of the steering wheel assembly have inner end surfaces proximate the peripheral surface of the center pad, and each spoke part of said overlay kit further includes an inner end having a flange adapted to be interposed between the inner end surface of the spoke and the peripheral surface of the center pad of the steering wheel assembly.

3. The overlay kit as defined in claim 1 wherein at least one of said ring part and said spoke parts is formed to have ergonomic enhancements.

4. The overlay kit as defined in claim 1, in which the ring-shaped and spoke parts include edges, the edges being feathered.

5. The overlay kit as defined in claim 1, in which the overlay is formed of an acrylic plastic material.

6. The overlay kit as defined in claim 1, in which the overlay is formed of a carbon fiber material.

7. The overlay kit as defined in claim 1, in which the overlay is formed of fiberglass.

8. An overlay for covering a steering wheel assembly, said overlay comprising:

a circumferential, ring-shaped part having a U-shaped cross section substantially conforming to the cross section of the upper portion of a circumferential, ring-shaped grip of the steering wheel assembly, the ring-shaped part of the overlay having an interior surface adapted to substantially fully engage and be adhesively bonded to the upper portion of the grip; and a plurality of spoke parts corresponding to generally radially inwardly extending spokes of the steering wheel assembly, the spoke parts extending generally radially inwardly from the ring-shaped part, each spoke part having a U-shaped cross section shaped to substantially conform to the cross section of the upper portion of the corresponding spoke of the steering wheel assembly and having an interior surface continuous with the interior surface of the ring-shaped part and adapted to substantially fully engage and be adhesively bonded to the upper portion of the spoke.

9. The overlay as defined in claim 8 wherein each spoke part further includes an inner end having a flange adapted to be interposed between an inner end surface of a spoke of the steering wheel assembly and a peripheral surface of a center pad of the steering wheel assembly.

10. The overlay as defined in claim 8 wherein at least one of said ring part and said spoke parts is formed to have ergonomic enhancements.

11. The overlay kit as defined in claim 8, in which the ring-shaped and spoke parts include edges, the edges being feathered.

12. The overlay kit as defined in claim 8, in which the overlay is formed of an acrylic plastic material.

13. The overlay kit as defined in claim 8, in which the overlay is formed of a carbon fiber material.

14. The overlay kit as defined in claim 8, in which the overlay is formed of fiberglass.

* * * * *